(12) United States Patent
Bussmann et al.

(10) Patent No.: US 11,647,694 B2
(45) Date of Patent: May 16, 2023

(54) METHOD FOR THE OPERATION OF A COMBINE HARVESTER, AND SELF-PROPELLED COMBINE HARVESTER

(71) Applicant: CLAAS Selbstfahrende Erntemaschinen GmbH, Harsewinkel (DE)

(72) Inventors: Jens Bussmann, Ostercappeln (DE); Bernd Holtmann, Sendenhorst (DE); Andreas Diekamp, Hilter (DE); Benedikt Poelling, Coesfeld (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 603 days.

(21) Appl. No.: 16/744,366

(22) Filed: Jan. 16, 2020

(65) Prior Publication Data

US 2020/0305352 A1 Oct. 1, 2020

(30) Foreign Application Priority Data

Mar. 27, 2019 (DE) ...................... 10 2019 107 840.7

(51) Int. Cl.
 *A01F 7/06* (2006.01)
 *A01F 12/40* (2006.01)
 (Continued)

(52) U.S. Cl.
 CPC .......... *A01F 7/067* (2013.01); *A01D 41/1271* (2013.01); *A01D 75/282* (2013.01); *A01F 12/40* (2013.01)

(58) Field of Classification Search
 CPC .............. A01D 41/127; A01D 41/1271; A01D 41/1243; A01F 12/00–12/60
 See application file for complete search history.

(56) References Cited

U.S. PATENT DOCUMENTS 3,689,119 A * 9/1972 Weichel ................. B65G 69/00
 406/162
3,792,709 A * 2/1974 Johnson, Jr. ............. B05B 9/06
 222/626

(Continued)

FOREIGN PATENT DOCUMENTS

DE  202014102621 U1 * 7/2015
DE  202016102139 U1 * 7/2016
 (Continued)

OTHER PUBLICATIONS

European Search Report dated May 29, 2020 issued in European Application No. 19 21 4364 with English translation of the relevant parts.

*Primary Examiner* — Adam J Behrens
*Assistant Examiner* — Madeline I Runco
(74) *Attorney, Agent, or Firm* — Collard & Roe, P.C.

(57) ABSTRACT

A method for the operation of a combine harvester includes processing a harvested material flow by at least one axial separator and ejecting a residual material flow formed in this way from the combine harvester by at least two ejection devices. The axial separator is formed by a movable vane element by means of which the residual material flow exiting from the axial separator is distributed on a work member downstream of the axial separator. In order to further improve the distribution of the residual material flow on the field, an actual distribution of the residual material flow on the two ejection devices is detected, wherein, when a deviation of the actual distribution from a predetermined reference distribution is detected, the vane element is readjusted so that the actual distribution is at least approximated to the reference distribution.

10 Claims, 8 Drawing Sheets

(51) Int. Cl.
*A01D 41/127* (2006.01)
*A01D 75/28* (2006.01)

(56) References Cited

U.S. PATENT DOCUMENTS

| | | | |
|---|---|---|---|
| 6,783,454 | B2 | 8/2004 | Bueermann |
| 7,485,035 | B1 | 2/2009 | Yde |
| 8,333,640 | B2 | 12/2012 | Bussmann |
| 2004/0242291 | A1* | 12/2004 | Weichholdt ........ A01D 41/1243 460/112 |
| 2005/0059445 | A1* | 3/2005 | Niermann .......... A01D 41/1243 460/112 |
| 2010/0120482 | A1* | 5/2010 | Holmen ............. A01D 41/1243 460/112 |
| 2012/0322521 | A1* | 12/2012 | Baumgarten ...... A01D 41/1276 460/69 |
| 2014/0066148 | A1 | 3/2014 | Dilts et al. |
| 2018/0235151 | A1* | 8/2018 | Isaac ........................ A01F 7/067 |
| 2019/0090428 | A1* | 3/2019 | Rittershofer ............ A01F 12/39 |
| 2020/0060082 | A1* | 2/2020 | Shinners ................. A01F 29/04 |

FOREIGN PATENT DOCUMENTS

| | | | | |
|---|---|---|---|---|
| EP | 1350424 | A1 | | 10/2003 |
| EP | 1856966 | A1 * | 11/2007 | ......... A01D 41/1243 |
| EP | 2364587 | A1 | | 9/2011 |

\* cited by examiner

METHOD FOR THE OPERATION OF A COMBINE HARVESTER, AND SELF-PROPELLED COMBINE HARVESTER

CROSS-REFERENCE TO RELATED APPLICATIONS

This application claims priority under 35 USC 119 of German Application No. DE 10 2019 107 840.7, filed on Mar. 27, 2019, the disclosure of which is herein incorporated by reference.

BACKGROUND OF THE INVENTION

The present application is directed to a method for the operation of a combine harvester and to a self-propelled combine harvester.

As a rule, the combine harvester comprises a threshing member by means of which grains can be detached from harvested plants, the intention being to obtain these grains separate from remaining plant residues. A mixture of detached grains and plant residues is fed as harvested material flow from the threshing member to at least one axial separator arranged downstream. This axial separator is typically constructed in such a way that it comprises a housing which has a circular cross section and a rotationally driven axial rotor located therein. A longitudinal axis of the axial rotor extends parallel to a center axis of the housing. A portion of the material formed at least substantially by the detached grains is separated out of the harvested material flow by means of the operation of the axial rotor. In this way, the harvested material flow is transferred to a residual material flow which is ejected at a rear end of the combine harvester. After treatment by means of the axial separator, the residual material flow is at least substantially free from grains. In known combine harvesters, it is conventional to use a plurality of axial separators, particularly two axial separators, in parallel.

The residual material flow is transferred from the axial separator to a downstream work member of the combine harvester, particularly a chopping member, and the residual material flow is distributed over a width of the work member by means of at least one movable vane element. When the work member is configured as a chopping member, the work member typically has an elongated output shaft with beater knives arranged thereon. These beater knives serve to process, particularly to comminute or chop, the residual material flow. This is particularly important when the residual material ejected from the combine harvester is not to be further utilized, particularly not removed from the field and utilized for another purpose. The comminution of the residual material is advantageous for accelerating the biological decomposition and consequent restoring of nutrients to the soil.

In order to ensure the distribution of the residual material flow, the combine harvester comprises at least two ejection devices to which the residual material flow is transferred downstream of the respective work member which is arranged downstream of the axial separator. Typically, a first ejection device communicates with a left-hand side of the work member, and the other ejection device communicates with the right-hand side. The residual material flow is finally ejected from the combine harvester by means of the ejection devices. The ejection devices can be, in particular, radial blowers by means of which the residual material flow is accelerated and then distributed as uniformly as possible on the field.

A method of the type described above is described, for example, in European Patent EP 2 364 587 B1. This document is directed to an axial separator for a combine harvester that is outfitted with a movable vane element. The vane element achieves the technical effect of distributing residual material transferred from the axial separator to the chopping member as uniformly as possible on the chopping member. To this end, the vane element cooperates with an actuator by means of which the vane element is movable relative to the housing of the axial separator. The vane element is located in a flow area of the transferred residual material flow so that the residual material flow impinges on the vane element and is deflectable by the latter. The deflection of the residual material flow can be changed by the movement of the vane element, and the residual material flow is accordingly selectively distributed on different areas of the chopping member.

In spite of such measures, it has been shown that the distribution of the residual material flow on the field is in need of further improvement. In particular, this has to do with the distribution of the grains remaining in the residual material flow which grow back after being deposited on the field and form a root network. As a result of inadequate distribution of these residual grains, striped areas with a concentration of residual grains are applied to the field so that the soil in these areas is consolidated by the developing roots. As a result, the soil cultivation to be carried out by the farmer at a later point in time is made more difficult. Therefore, it is desirable to distribute the residual material flow, including the grains contained therein, as homogeneously as possible on the field so that local consolidation of the soil is minimized.

SUMMARY OF THE INVENTION

Therefore, the object upon which the present application is based is to further improve the distribution of the residual material flow on the field.

This object is met according to the invention by a method for the operation of a combine harvester, wherein a harvested material flow is processed by at least one axial separator and a residual material flow formed in this way is ejected from the combine harvester by means of at least two ejection devices. The axial separator comprises a movable vane element by means of which the residual material flow exiting from the axial separator is distributed on a work member downstream of the axial separator. An actual distribution of the residual material flow on at least two ejection devices is detected. Subsequently, when a deviation of the detected actual distribution from a predetermined reference distribution is determined, the vane element of the axial separator is readjusted in such a way that the actual distribution is at least brought closer to the reference distribution.

The detection of the actual distribution can preferably be carried out by means of at least one sensor device in at least one measuring location downstream of the axial separator, and the sensor device acquires data pertaining to the actual distribution. The data acquired in this matter are then routed to a control unit and processed by means of the latter. The examination of the above-mentioned deviation between the actual distribution and the reference distribution can be accomplished in a particularly simple manner by means of a control unit of this kind.

In an exemplary embodiment, data are acquired in at least one measuring location in a transfer area between a work member formed as chopping member and the at least two ejection devices by means of a sensor device, on the basis of which data the ratio in which the two ejection devices are charged with residual material proceeding from the chopping member can be detected. These data accordingly describe the above-mentioned actual distribution. The predetermined reference distribution can provide, in particular, a balanced distributing ratio according to which the residual material is divided in a 50:50 split so that the two ejection devices are charged with equal portions of residual material. An actual distribution deviating from this reference distribution would be detected by means of the sensor device and routed to the control unit. In this example, the control unit is suitable for generating control commands depending on the determined deviation of the actual distribution from the reference distribution and conveying these control commands to the vane element. In this way, the vane element is readjusted in such a way that the actual distribution is at least approximated to the reference distribution. Accordingly, as a result, a feedback takes place between a factual actual distribution of the residual material flow and the predetermined reference distribution of the residual material flow on the work member which is preferably carried out constantly. Therefore, the sensor device, the control unit and the vane element form a control loop. A control frequency of the control loop formed in this way can amount to 10 Hz, for example. Other control frequencies, both higher and lower control frequencies, are equally conceivable.

The method according to the invention has many advantages. In particular, it is helpful for optimizing the distribution of the residual material flow so that the residual material is distributed as uniformly as possible on the field in the course of being ejected from the combine harvester. In particular, the readjustment of the vane element can have a direct or indirect influence on the actual distribution of the residual material flow which then at least approximates the predetermined reference distribution and, ideally, achieves the reference distribution. As a result, the distribution of the residual material flow on the field is carried out in a particularly uniform manner.

In an advantageous embodiment of the method according to the invention, a control unit can be used, by means of which, depending on the deviation between the actual distribution and the reference distribution, control commands are generated and are routed indirectly or directly to the vane element. In particular, the control commands can be supplied to an actuator of the vane element by means of which the vane element is driven. In a particularly advantageous configuration, characteristic maps are stored in the control unit (or a data storage thereof) by means of which data pertaining to the actual distribution of the residual material flow are related to a movement characteristic of the vane element so that the way in which the movement characteristic of the vane element should be changed can be derived on the basis of such characteristic maps in order to change the actual distribution in the direction of the aimed-for reference distribution.

A further advantageous configuration provides that data pertaining to the actual distribution of the residual material flow are acquired by means of a plurality of sensor devices. The sensor devices are preferably arranged at different measuring locations. In this way, changes in the actual distribution of the residual material flow can be better observed and corresponding control commands for the vane element can be carried out in a more targeted and prompt manner.

Further, a configuration of the method according to the invention in which the controlling of the vane element is carried out automatically can be advantageous. This can happen particularly depending on a control algorithm which is stored in the control unit and which automatically conveys control commands which are derived from the acquired data to the vane element depending on the acquired data and influences the movement of the vane element in this way. For example, it is possible that a movement speed of the vane element is changed so that a distribution of the residual material flow transferred from the axial separator to a work member constructed as a chopping member is changed. The change in the distribution of the residual material flow over the width of the chopping member has a predictable effect on the distribution of the residual material flow exiting the chopping member on the downstream ejection devices. For example, it is conceivable that the distribution of the residual material flow over the width of the chopping member is asymmetrical as a result of the operative gravitational force on a sloping site of the field to be worked so that, for example, the left-hand side of the chopping member receives a greater portion of the residual material flow than the right-hand side. This would result in an uneven charging of the ejection devices, which would result in a deviation from the reference distribution which is selected in this instance, by way of example, for a balanced distribution ratio between the ejection devices. This uneven charging of the ejection devices can now be counteracted by changing the movement characteristic of the vane element. For example, the vane element can be moved such that it guides the residual material flow more in the direction of the right-hand side of the chopping member so that the two halves of the chopping member (and consequently the two ejection devices) are charged as uniformly as possible with residual material. The automatic control of the vane element obviates action on the part of a machine operator, and a constant controlling of the vane element can be carried out. In this way, the control loop according to the invention can be operated with a high sample rate so that the actual distribution is constantly influenced with the aim of achieving the predetermined reference distribution.

In a particularly advantageous manner, the data pertaining to the actual distribution of the residual material flow are acquired constantly, preferably with a frequency of at least 10 Hz. Correspondingly, it may be particularly advantageous when control commands are constantly supplied to the vane element and, in particular, a movement velocity of the vane element is constantly changed. In a procedure of this kind, the distribution of the residual material flow on the field is subject to an uninterrupted monitoring which has immediate consequences when deviations are detected between the actual distribution and the predetermined reference distribution so that the deviation is at least reduced.

In a particularly advantageous configuration of the method according to the invention, further data beyond the actual distribution of the residual material flow are acquired. In particular, these data can pertain to the type of respective harvested material, current harvesting conditions, machine data of the combine harvester and/or a reference swath width of the ejected residual material flow. Data pertaining to the respective harvested material can be entered by a machine operator of the combine harvester before harvesting is begun, for example, and this information is generally not changed during a harvesting process. Harvesting conditions such as, for example, weather conditions (wind, rain, etc.), environmental conditions (slope of the field, soil condition, etc.), operating conditions of the combine harvester (driving speed, aimed-for residual grain proportion, etc.) can be collected individually once, periodically or continuously. The machine data of the combine harvester are generally unchanged during an ongoing harvesting process. Data pertaining to the reference swath width can be predetermined in particular by the machine operator, whereupon they can be taken into account appropriately. Such additional data can be processed in particular by means of a control unit so that they can be taken into account additionally for generating control commands for the vane element. The distribution of the residual material on the field can be further improved in this way.

In addition to a control of the at least one vane element of the at least one axial separator, it may be advantageous in addition when the control unit generates control commands for at least one distributing plate of the distributing device downstream of the ejection devices and delivers these control commands to the respective distributing plate. The distributing plate is movable relative to the rest of the distributing device so that an ejection characteristic of the residual material flow is changed by means of a movement of the vane element. The distributing device comprises a plurality of distributing plates which are suitable for fanning out the residual material flow emitted from the ejection devices. This is generally required in order to distribute the residual material flow over a width which appreciably exceeds a width of the rear end of the combine harvester. It is particularly desirable to distribute the residual material flow over the width of a cutting mechanism of the combine harvester because the latter defines the working width of the combine harvester. A uniform distribution of the residual material flow over the working width of the combine harvester would therefore use the entire surface area of the respective field on which the residual material flow is deposited. This is desirable in order to minimize the density of grains remaining in the residual material flow per surface area percentage of the field.

When a distributing device of the type described above is present, it is advantageous in addition when at least one measuring location in which data pertaining to an actual distribution of the residual material flow are acquired by means of at least one sensor device is arranged at or in the distributing device. These data can then be compared with a predetermined reference distribution by means of a control unit, whereupon the control unit generates control commands for the at least one adjustable distributing plate and sends these control commands indirectly or directly to the distributing plate. In this way, the distributing plate can be moved relative to the rest of the distributing device so that the distribution of the residual material flow at least comes closer to the reference distribution. For purposes of moving the distributing plate, the distributing plate can cooperate, for example, with an electric or hydraulic actuator.

The object upon which the application is based is met with regard to the device by means of a combine harvester having at least one sensor device by means of which data pertaining to an actual distribution of the residual material flow on the at least two ejection devices are detectable. Further, the combine harvester according to the invention comprises at least one control unit by means of which data acquired by the sensor device can be processed. The sensor device and the control unit are connected to one another in a data-transmitting manner, for example, by means of a physical line or wirelessly, so that data can be routed from the sensor device to the control unit. The control unit and the vane element are likewise connected to one another in data-transmitting manner so that control commands can be directed from the control unit indirectly or directly to the vane element. In particular, the vane element can cooperate with an actuator which receives the control commands and carries out a movement of the vane element in a corresponding manner.

The method according to the invention can be implemented in a particularly simple manner by means of the combine harvester according to the invention. The advantages resulting from this have already been stated. In particular, the possibility is provided to at least approximate an actual distribution of the residual material flow to a reference distribution so that the residual material flow can be distributed on the field in a more uniform manner compared with the prior art.

In a further development of the combine harvester according to the invention, at least one sensor device is arranged in at least one measuring location in a fall-in area of a work member constructed as chopping member. The fall-in area of the chopping member describes the area in which the residual material proceeding from the axial separator falls into the chopping member. Arranging the sensory device in this measuring location provides the possibility of detecting the distribution of the residual material flow over the full width of the chopping member.

Alternatively or additionally, at least one sensor device can be arranged in at least one measuring location at or in a bottom plate of a chopping member of this kind. Arranging a sensor device at such a measuring location provides the possibility of detecting the distribution of the residual material flow inside the chopping member. The combination of this measuring location with the measuring location described above in the fall-in area of the chopping member is particularly advantageous for dynamic tracking of the distribution of the residual material flow over the width of the chopping member. In particular, creeping of the residual material flow in width direction of the chopping member due to the operation of the chopping member can take place, which could not be taken into account if data pertaining to the actual distribution of the residual material flow, for example, in the fall-in area of the chopping member, were acquired exclusively.

Finally, it can be further advantageous to arrange at least one sensor device in at least one measuring location at a distributing device which is arranged downstream of the ejection devices. The arrangement of a sensor device at this measuring location can be carried out in addition to or as an alternative to the measuring locations mentioned earlier. In a particularly advantageous manner, sensor devices are arranged at all three of the measuring locations described. The measuring location arranged in the distributing device offers the particular advantage that the data acquired in that location are indicative of the actual distribution of the residual material flow immediately before exiting the combine harvester. A change in the movement characteristic of the vane element merely has an indirect influence on the actual distribution of the residual material flow in the distributing device, but allows correlations to be discovered between changes in the movement characteristic of the vane element and the distribution of the residual material flow in the distributing device. In addition, the arrangement of at least one sensor device in the distributing device allows at least one distributing plate of the distributing device to be controlled as was described above.

The acquisition of data at a plurality of measuring locations makes it possible to keep track of the residual material to certain extent from the axial separator until it exits the combine harvester. The influence of a change in the movement characteristic of the vane element can be traced particularly well in this way.

Lastly, a combine harvester in which at least one sensor device is constructed in the form of a measuring strip is particularly advantageous. A measuring strip of this kind comprises a plurality of sensor elements which are spaced apart from one another and which are preferably arranged so as to be distributed equidistantly along the measuring strip. In particular, it is conceivable that a sensor device constructed as measuring strip extends over an entire width of a respective monitored area so that a transverse distribution of the residual material in the respective area is detectable. When a sensor arrangement is arranged, for example, in the fall-in area of a chopping member, the sensor device constructed as measuring strip can extend over the full width of the chopping member, and a plurality of sensor elements, for example, five sensor elements, are arranged so as to be distributed over the entire length of the measuring strip. Data acquired in this way are particularly well suited for assessing the actual distribution of the residual material flow. When such data are made available, the control unit can generate particularly targeted control commands for the vane element as well as track changes in the actual distribution resulting from the control commands.

BRIEF DESCRIPTION OF THE DRAWINGS

The invention will be described in more detail in the following referring to an embodiment example shown in the figures. The drawings show.

DETAILED DESCRIPTION OF THE EMBODIMENTS

Figure 1:
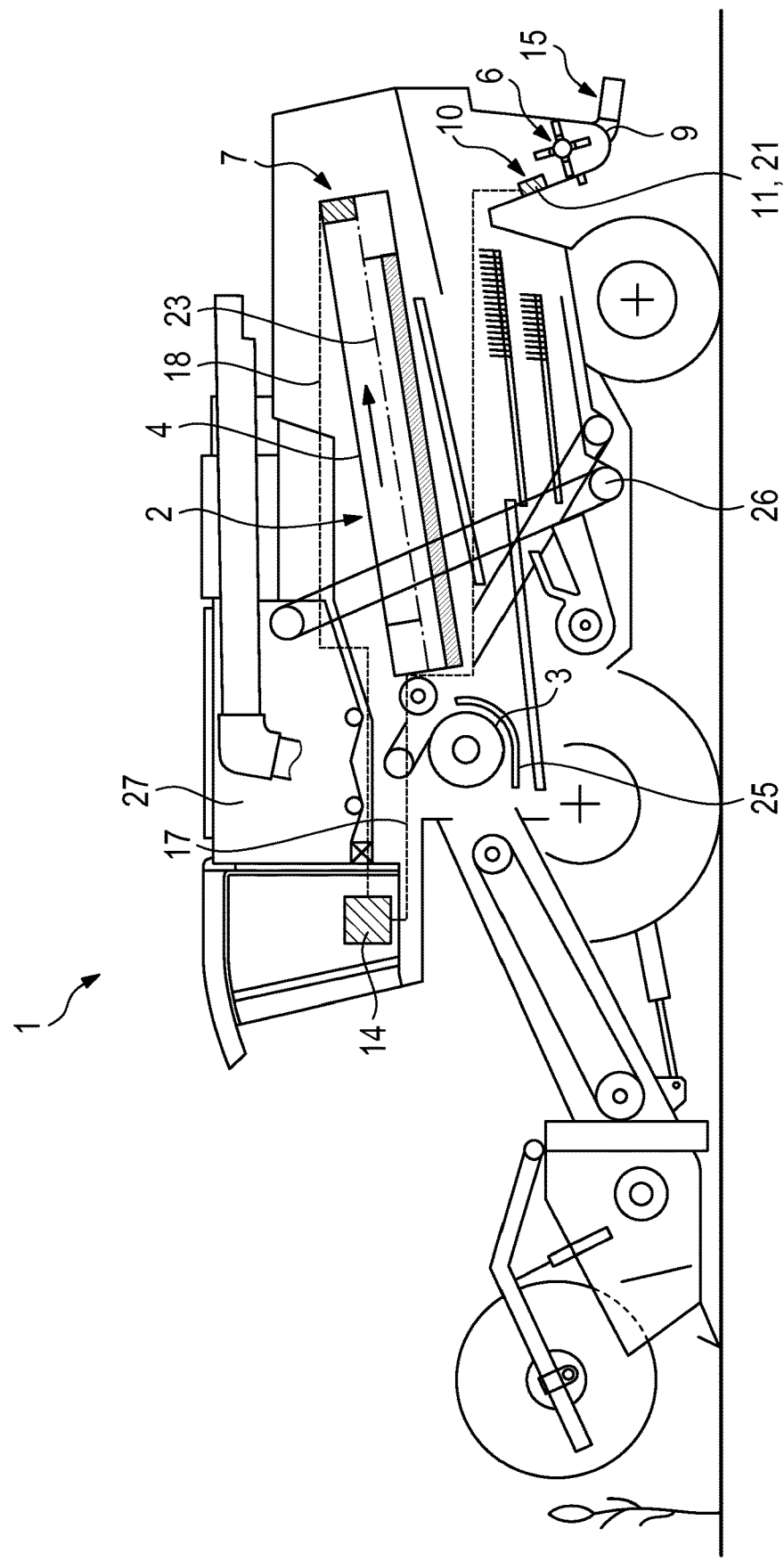
FIG. 1 a cross section through a combine harvester according to the invention.
Figure 2:
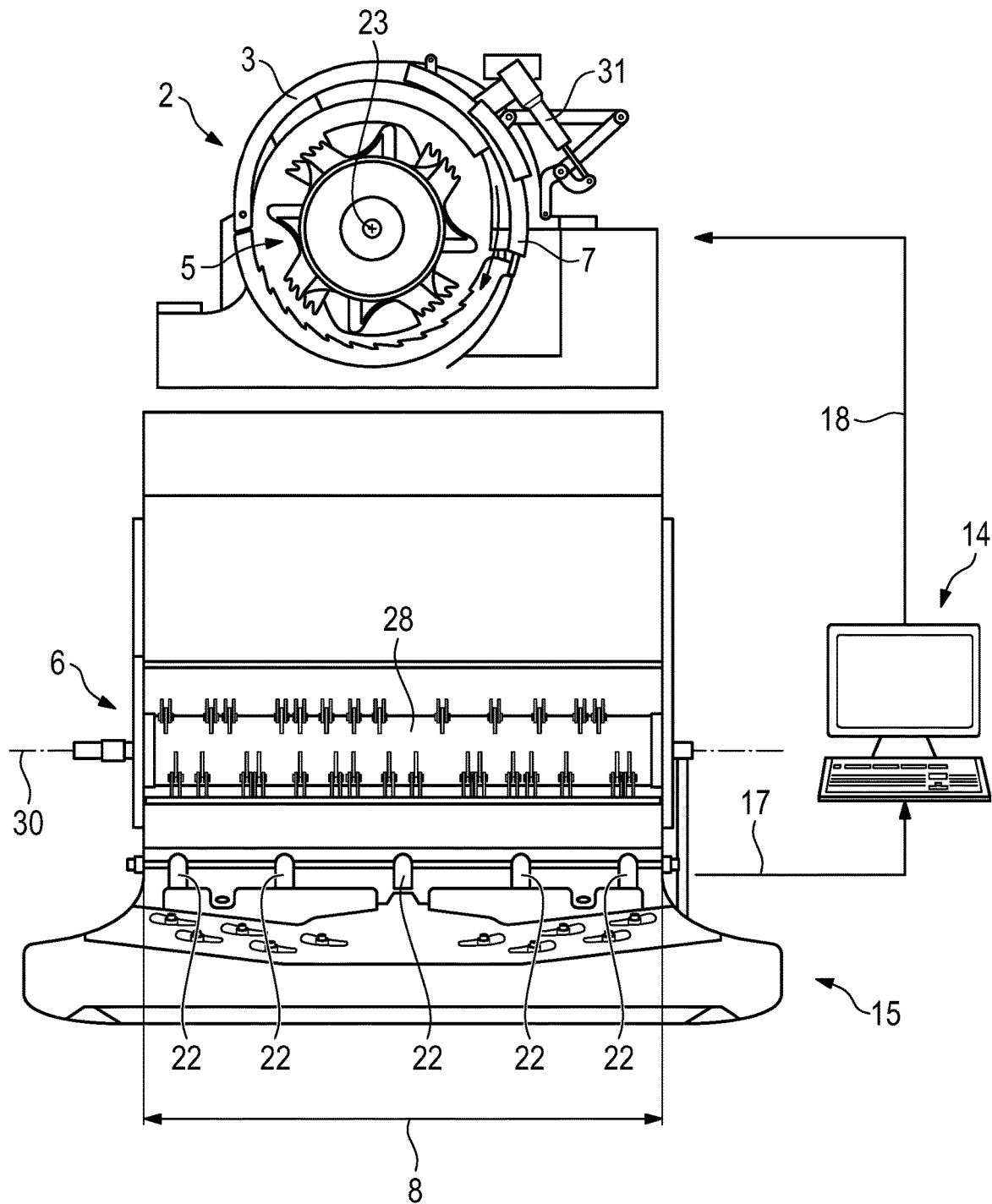
FIG. 2 a schematic view of a rear end of an axial separator and of a downstream work member constructed as chopping member.
Figure 3:
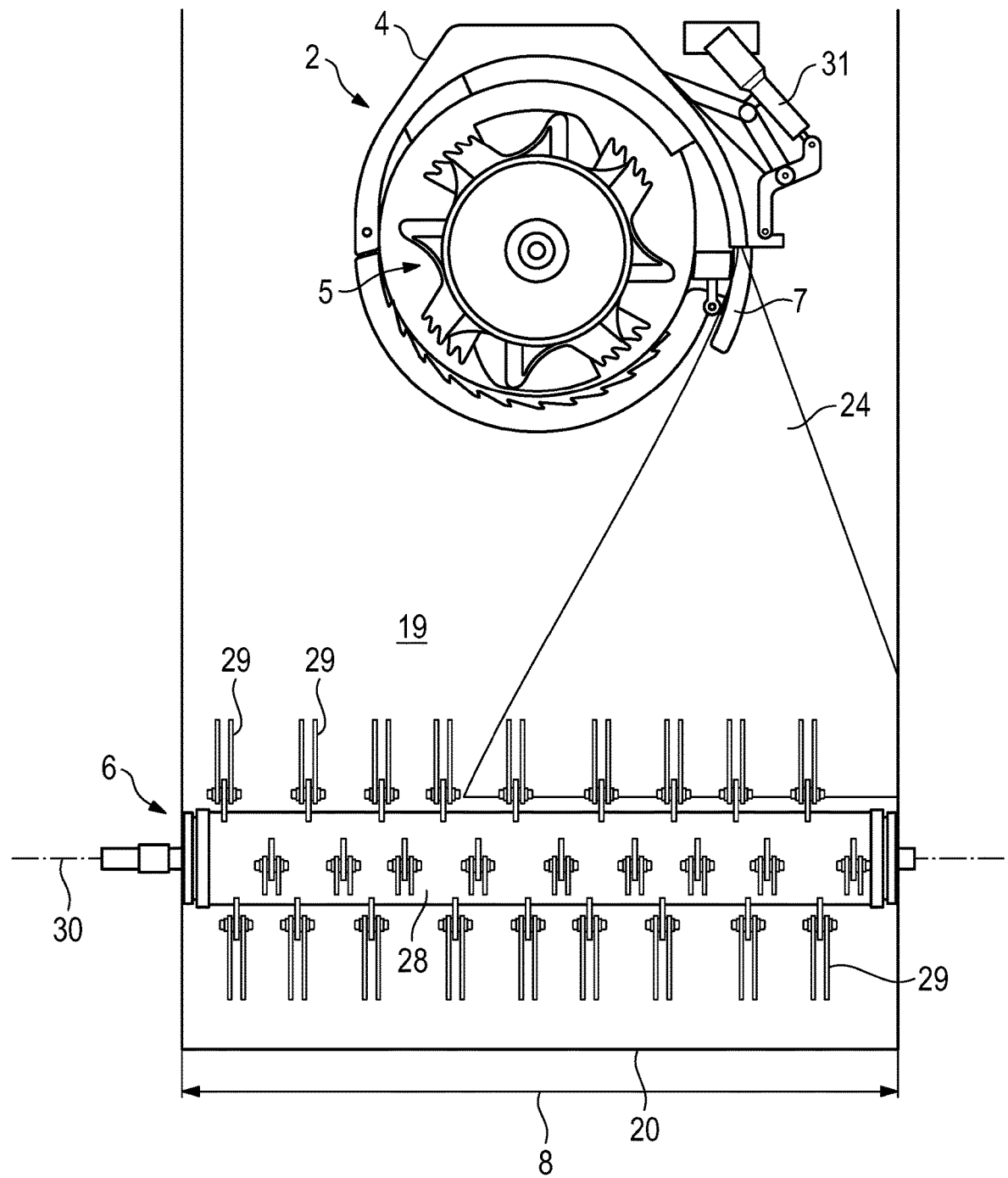
FIG. 3 a schematic view of a residual material distribution proceeding from the axial separator to the chopping member with a vane element in a first position.
Figure 4:
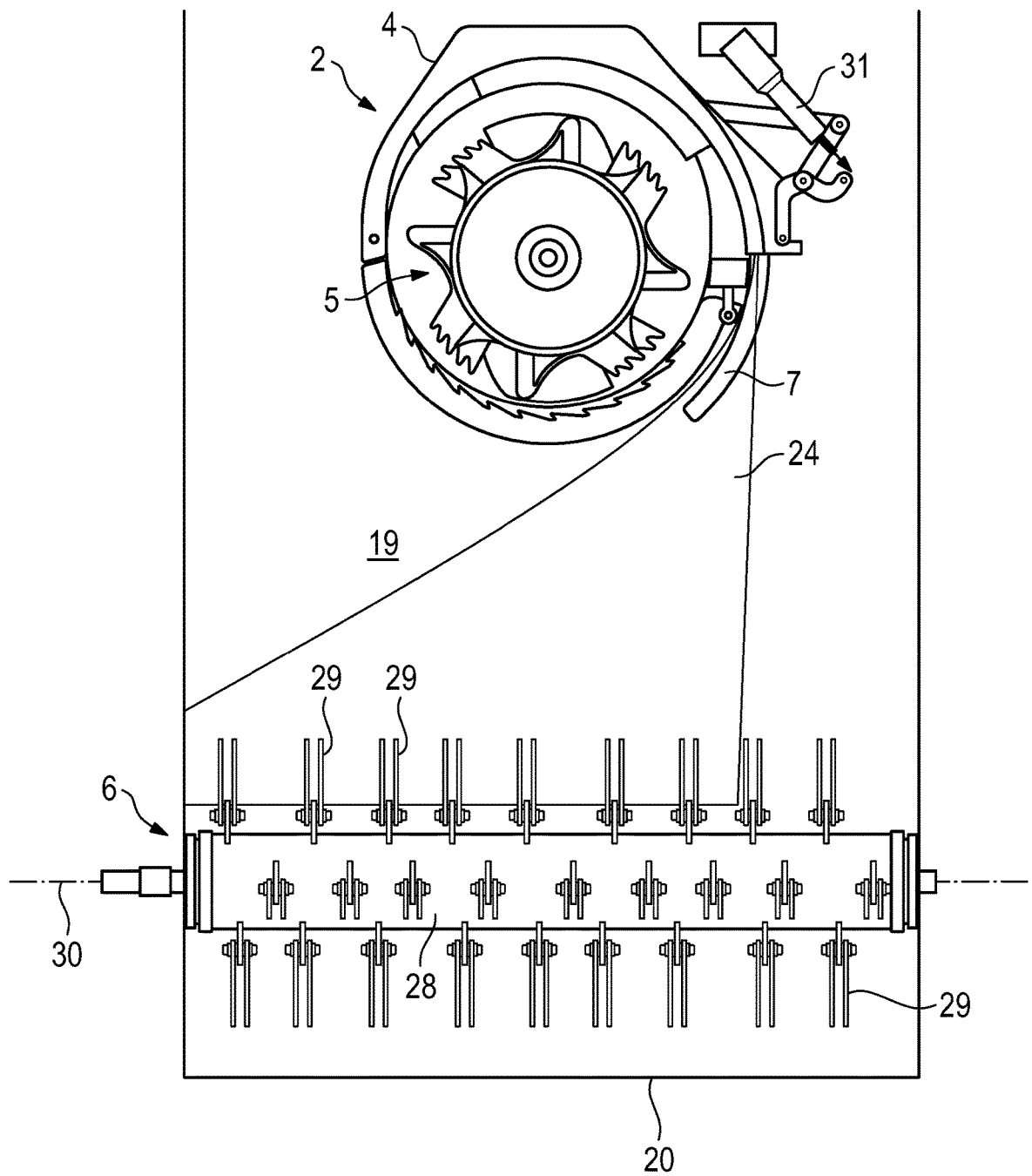
FIG. 4 the schematic view according to FIG. 3, wherein the vane element is in a second position.

An embodiment example which is shown in FIGS. 1 to 9 comprises a combine harvester 1 according to the invention which is outfitted with an axial separator 2. This axial separator 2 is arranged downstream of a threshing member 3 from which a harvested material flow is transferred to the axial separator 2. Harvested plants are processed by means of the thresher member 3 such that grains are detached from remaining plant residues. Most of the grains are diverted through a threshing concave 25 directly in direction of a conveying device 26 by means of which the grains can be conveyed into a grain tank 27. The remaining plant residues are transferred to the axial separator 2 together with the rest of the grains that could not be immediately separated out by means of the threshing member 3. Therefore, the rest of the grains together with the plant residues form the harvested material flow. The axial separator 2 serves to separate the grains contained in the transferred harvested material flow from the plant residues so that the grains are obtained in their entirety as far as possible. The harvested material flow is transferred into a residual material flow by means of the axial separator 2 as a result of separating the material portion formed by grains. This residual material flow substantially consists of plant residues but generally still contains a residual portion of grains.

The separation of the grains is carried out by means of an axial rotor 5 which is drivable in rotation around its longitudinal axis 23 and which is supported inside a housing 3 of the axial separator 2. At a rear end of the axial separator 2 remote of the threshing member 3, the axial separator 2 comprises a vane element 7 which is formed in this instance by a baffle that is curved corresponding to a curvature of the housing 3. The vane element 7 is constructed to be movable relative to the housing 3 and, for this purpose, cooperates with an electrohydraulic actuator 31 by means of which the vane element 7 is drivable. The residual material flow which exits from the axial separator 2 and is guided spirally or helically inside of the housing 3 exits the axial separator 2 predominantly at a limited circumferential area of the housing 3. The vane element 7 is associated with this circumferential area so that the vane element 7 can influence a stream of the residual material flow. In particular, vane element 7 projects into a stream area of the residual material flow so that the residual material flow can impinge on the vane element 7 when exiting the axial separator 2 and can be deflected in this way. The influence of the vane element 7 on the type and intensity of the deflection of the residual material flow can be changed by means of the movement of the vane element 7 relative to the housing 3. As a result, the residual material flow is transferred in a different manner to a work member 6 arranged downstream of the axial separator 2 depending on a position of the vane element 7. This work member 6 is formed in this instance as a chopping member.

The work member 6 is arranged vertically below the axial separator 2 so that the residual flow emitted from the axial separator 2 falls into the work member 6 to a certain extent. The work member 6 has an elongated shaft 28, a plurality of beater knives 29 being arranged at the outer lateral surface thereof. These beater knives are fastened in an articulated manner to the shaft 28 so that they are spun radially outward during the course of a rotation of the shaft 28 around a drive 30 as a result of operative centrifugal forces. The kinetic energy operating over the course of the rotation of the shaft 28 is utilized to comminute the residual material falling down into the work member 6 by means of the beater knives 29. The shaft 28 of the work member 6 extends over a width 8 which therefore corresponds to the width 8 of the work member 6. It is now possible by means of vane element 7 to distribute the residual material flow over the width 8 of the work member 6 so that the work member 6 is charged with residual material as uniformly as possible along its entire width 8. As a result, a transfer of the chopped residual material to downstream ejection devices 9 is likewise carried out with a distribution taking place in equal portions so that a uniform ejection of the residual material at the rear end of the combine harvester 1 is in turn facilitated. In the present example, the combine harvester 1 comprises a total of two ejection devices 9 which are arranged side by side and downstream of the work member 6. As a result, the position of the vane element 7 at the axial separator 2 has an indirect influence on the manner in which the residual material is distributed on the field in the course of being ejected from the combine harvester 1. A change in the position of the vane element 7 relative to the housing 4 of the axial separator 2 accordingly results in that the distribution of the residual material on the field is also changed.

The combine harvester 1 is outfitted with a control loop comprising in this instance a sensor device 10 and a control unit 14. The sensor device 10 serves to acquire data pertaining to an actual distribution of the residual material downstream of the axial separator 2 and to route this data to the control unit 14. This can be carried out in particular by means of a line 17. However, wireless transmission of the data is also possible. The acquired data can be processed by means of the control unit 14 so that control commands can be generated for the vane element 7. The latter is connected to the control unit 14 by means of a line 18 in this case so that the control commands can be routed at least mediately to the vane element 7. Vane element 7 comprises an actuator 31 which is formed in this instance by an electrohydraulic cylinder. The actuator 31 is controllable by means of the control unit 14 so that the vane element 7 is moved. This movement can now be controlled as a result of the feedback via the data acquired by means of the sensor device 10 such that the distribution of the residual material emitted by the axial separator 2 changes over the width 8 of the downstream work member 6. In particular, at least one predetermined reference distribution is stored in the control unit 14 or in a data storage thereof and can be compared with an actual distribution acquired by means of the sensor device 10. In this way, a deviation of the actual distribution from the reference distribution can be determined, as result of which the control commands can be generated for the vane element 7. In particular, the reference distribution can provide a balanced distributing ratio of the residual material flow to the two ejection devices 9.

Accordingly, it is conceivable, for example, that it is determined by means of a sensor device 10 arranged at a measuring location 11 in a fall-in area 19 of the work member 6 that the left-hand side of the work member 6 receives a larger proportion of the residual material flow transferred from the axial separator 2 than the right-hand side. As a result, the actual distribution of the residual material flow is also asymmetrical when exiting from the work member 6 and therefore when transferred to the ejection devices 9. However, the predetermined reference distribution provides a uniform distribution of the residual material flow to two ejection devices 9. The difference between the actual distribution and the reference distribution is converted by the control unit 14 to the effect that a control command is directed to the actuator 31 of the vane element 7, as a result of which the vane element 7 is moved. This movement is carried out in such a way that the deflection caused by the vane element 7 and the resulting distribution of the residual material flow on the work member 6 is changed such that a larger proportion of the residual material flow than before is guided to the right-hand side of the work member 6. As an indirect result of this action, the actual distribution of the residual material flow is brought more into line with the reference distribution.

In a particularly advantageous manner, the vane element 7 is moved constantly relative to the housing 3 of the axial separator 2 in order to distribute the residual material flow continuously over the width 8 of the work member 6. In particular, the vane element 7 can carry out a "pendulum" movement over the course of which the vane element 7 is moved constantly between opposite extreme positions. This can be seen particularly clearly in FIGS. 3 and 4 in which the vane element 7 is shown in different positions which correspond in turn to different distributing areas 24 over which the residual material flow exiting from the axial separator 2 is distributed. A pendulum movement of the vane element 7 is therefore particularly favorable for charging the work member 6 uniformly with residual material constantly over its entire width 8 and accordingly for achieving a corresponding equally apportioned charging of the ejection devices 9.

By means of the control unit 14, it is possible in particular to control the actuator 31 of the vane element 7 in such a way that a movement characteristic of the vane element 7 is changed. This achieves the effect that the residual material flow is distributed from then on in a different way than was the case before the change in the movement characteristic. The manipulation of the movement characteristic of the vane element 7 is carried out in such a way that the deflection of the residual material flow by means of the vane element 7 leads to a distribution of the residual material flow on the work member 6 that is at least closer to the reference distribution than the actual distribution prior to the change of the movement characteristic. Since data pertaining to the distribution of the residual material flow by means of the sensor device 10 is constantly acquired, a constant adaptation of the movement characteristic of the vane element 7 can take place correspondingly, and its influence is then immediately checked again. Consequently, sensor device 10, control unit 14 and vane element 7 form a control loop.

Figure 5:
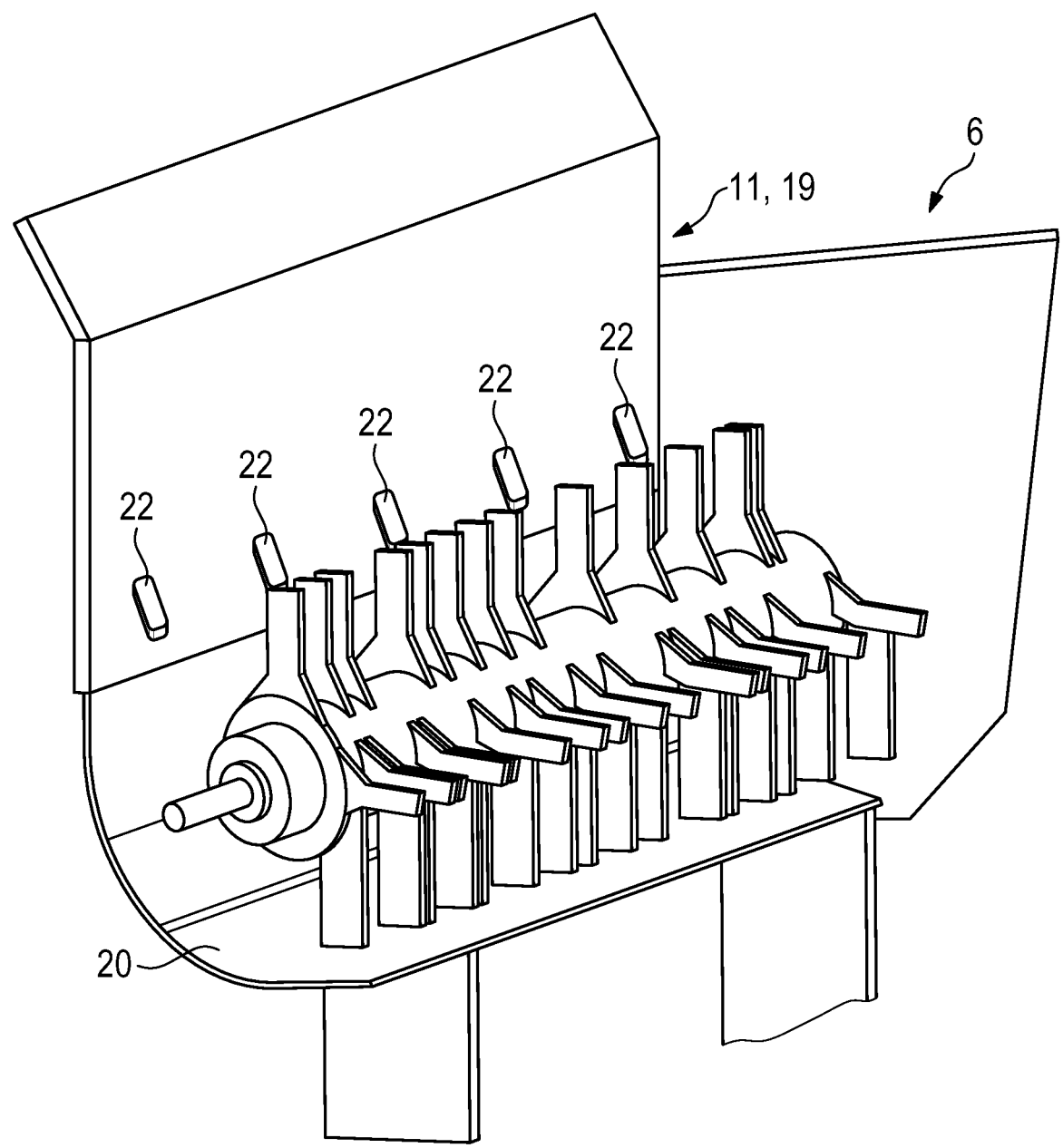
FIG. 5 a perspective view of the chopping member, wherein a sensor device is arranged in a fall-in area of the chopping member.
Figure 6:
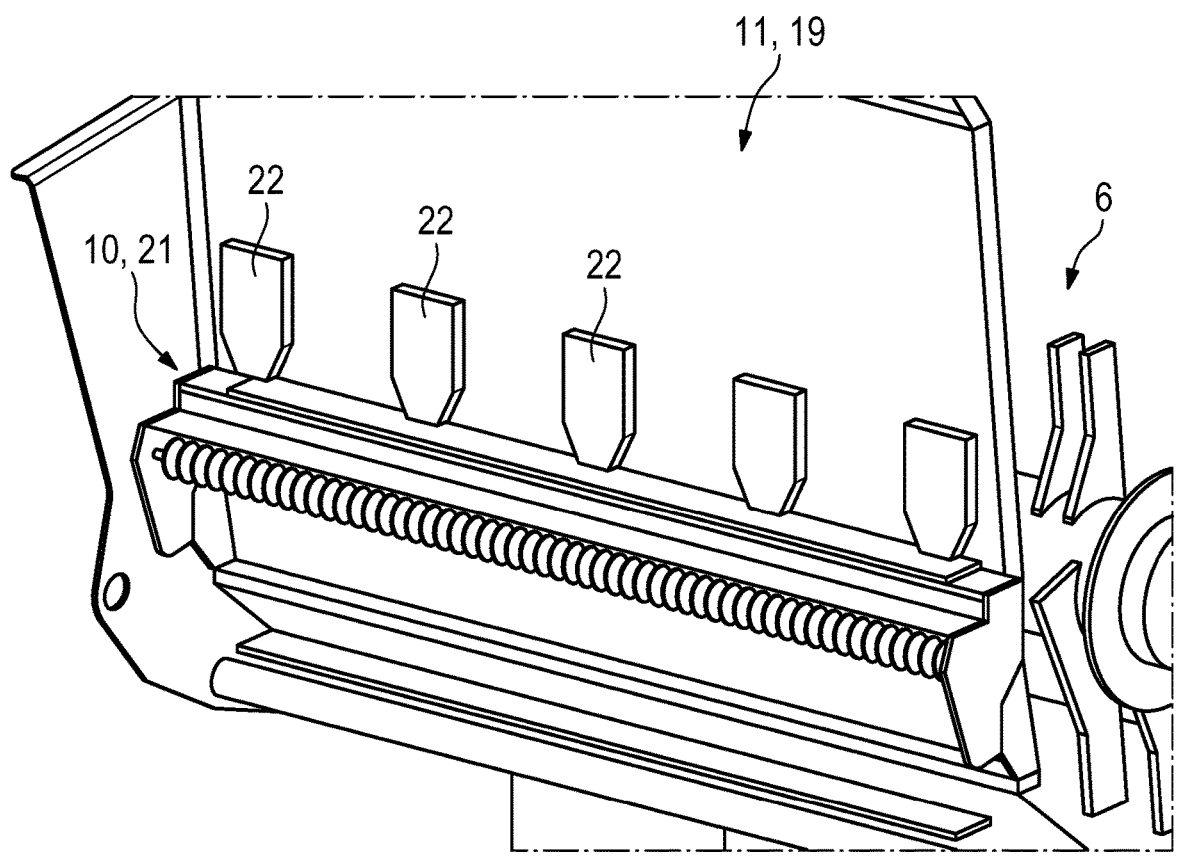
FIG. 6 a rear view of the chopping member according to FIG. 5.
Figure 7:
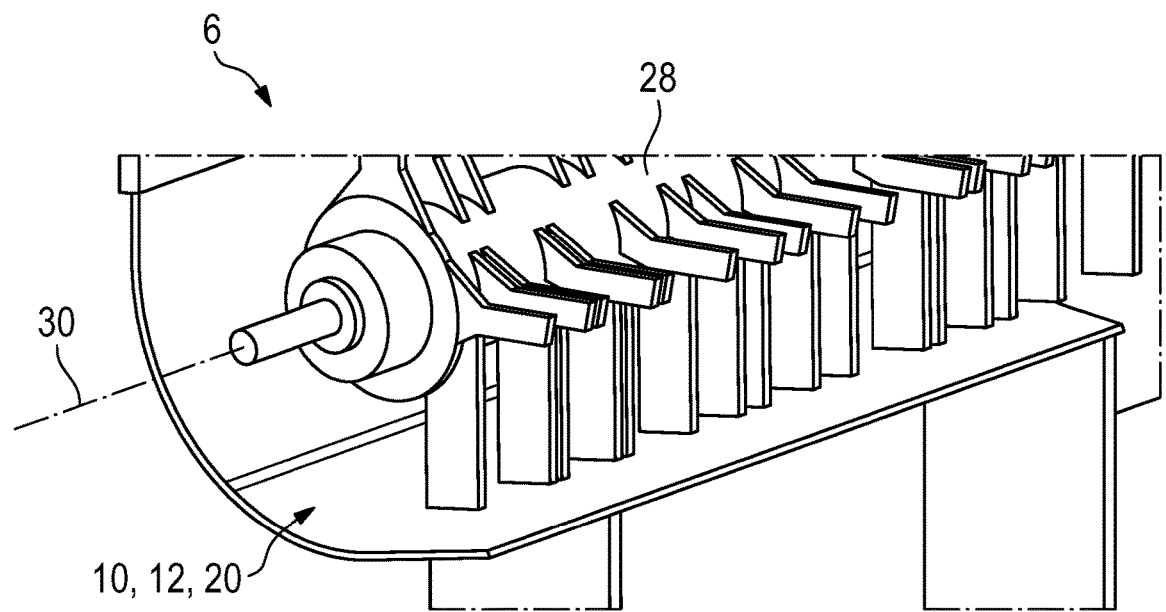
FIG. 7 a perspective view of a bottom area of the chopping member, wherein a sensor device is arranged in a bottom plate of the chopping member.
Figure 8:
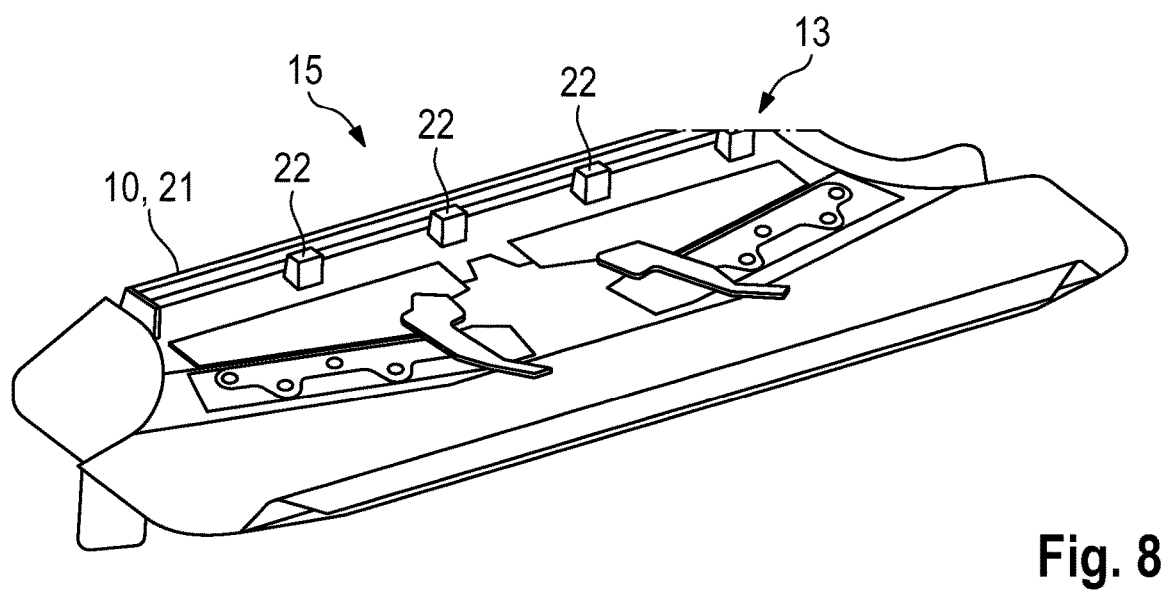
FIG. 8 a perspective view of a distributing device which is outfitted with a sensor device.
Figure 9:
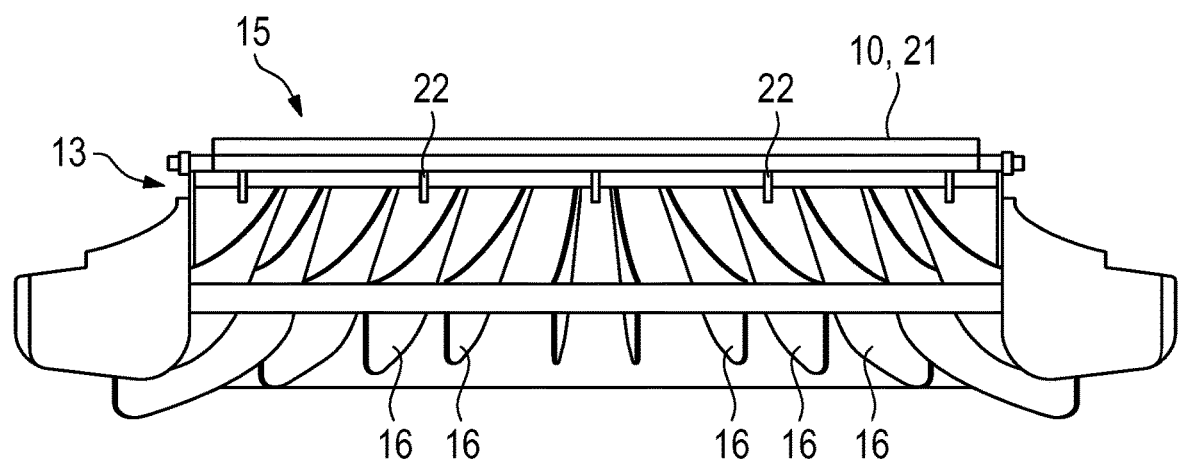
FIG. 9 another view of the distributing device according to FIG. 8.

In the depicted example, the combine harvester 1 comprises a plurality of sensor devices 10 which are arranged at various measuring locations 11, 12, 13. As has already been described above, a first sensor device 10 is arranged at a first measuring location 11 in the fall-in area 19 of the work member 6. This sensor device 10 which is shown particularly clearly in FIGS. 5 and 6 is formed in the depicted example as a measuring strip 21 comprising a plurality of sensor elements 22. These sensor elements 22 are arranged so as to be distributed equidistantly over a length of the measuring strip 21, the measuring strip 21 extending over the entire width 8 of the work member 6. The actual distribution of the residual material flow over the width 8 of the work member 6 can be acquired particularly well by means of the plurality of sensor elements 22.

The combine harvester 1 further comprises a further sensor device 10 at a second measuring location 12. Measuring location 12 is located at a base plate 20 of the work member 6. This is shown particularly clearly in FIG. 7. While the actual distribution of the residual material is detectable by means of the first sensor device 10 at measuring location 11 as it enters the work member 6, there is a high possibility of acquiring data pertaining to the actual distribution of the residual material directly inside of the work member 6 by means of the second sensor device 10. In this way, it is possible to take into account an influence of the work member 6 on the actual distribution of the residual material over the width 8 of the work member 6.

Finally, the combine harvester 1 shown here has a third sensor device 10 which is likewise formed as a measuring strip 21. This measuring strip 21 is located at a measuring location 13 which is associated with a distributing device 15. The distributing device 15 is arranged downstream of the two ejection devices 9. It serves to distribute the residual material ejected by means of the ejection devices 9 over an ejection width which appreciably exceeds a width of the rear end of the combine harvester 1. In other words, the ejected residual material flow is "fanned out" to a certain extent by means of the distributing device 15 so that it is possible to distribute the residual material over an entire working width of the combine harvester 1. To this end, the distributing device 15 which is shown particularly clearly in FIGS. 8 and 9 has a plurality of baffles 16 by means of which the fanning out of the residual material flow is carried out. In this instance, sensor device 10 comprises a total of five sensor elements 22 which are arranged so as to be distributed equidistantly along a length of the measuring strip 21. By means of the sensor elements 22, it is possible to acquire data pertaining to the actual distribution of the residual material flow all along a width of the distributing device 15. Data which characterize the actual distribution of the residual material flow immediately before exiting the combine harvester 1 are acquired in this way.

In the depicted example, a plurality of baffles 16 are displaceable, respectively, relative to the rest of the distributing device 15 in a particularly advantageous manner by means of an associated actuator, not shown in the drawings. The actuator is connected to the control unit 14 wirelessly, i.e., by means of a radio link. Accordingly, the combine harvester 1 according to the invention has a second control loop by means of which the actual distribution of the residual material in the area of the distributing device 15 is compared to a correspondingly predetermined reference distribution, control commands are generated and, lastly, a position of the movable baffles 16 is changed. This happens provided that any deviations of the actual distribution of the residual material from the reference distribution in the distributing device 15 are compensated in such a way that the ejection of the residual material is changed by means of a change in the position of the respective baffles 16 so that the deviations of the actual distribution from the reference distribution in the course of the ejection of the residual material flow are compensated, and the residual material is ultimately deposited on the field by a distribution that is as homogeneous as possible.

The combination of two control loops is particularly advantageous because, in this way, the actual distribution of the residual material is controllable at a plurality of locations so that, on the whole, the residual material flow can be influenced in such a way as it proceeds from the axial separator 2 until being ejected from the combine harvester 1 that a homogeneous distribution on the field can be achieved.

REFERENCE CHARACTERS 1 combine harvester
2 axial separator
3 threshing member
4 housing
5 axial rotor
6 work member
7 vane element
8 width
9 ejection device
10 sensor device
11 measuring location
12 measuring location
13 measuring location
14 control unit
15 distributing device
16 distributing plate
17 line
18 line
19 fall-in area
20 bottom plate
21 measuring strip
22 sensor element
23 longitudinal axis
24 distributing area
25 threshing concave
26 conveying device
27 grain tank
28 shaft
29 beater knife
30 drive axis
31 actuator

What is claimed is:

1. A method for the operation of a combine harvester comprising:
   processing a harvested material flow with at least one axial separator that comprises a movable vane element by which residual material flow exiting from the axial separator is distributed on a work member downstream of the axial separator,
   ejecting the residual material flow formed in the processing step from the combine harvester by means of at least two ejection devices,
   detecting an actual distribution of the residual material flow on the two ejection devices, and
   readjusting the movable vane element by changing a movement speed of the vane element when a deviation of the actual distribution from a predetermined reference distribution is detected so that the actual distribution is at least approximated to the reference distribution.

2. The method according to claim 1, wherein the reference distribution comprises a distributing ratio balanced between the ejection devices.

3. The method according to claim 1, further comprising the following method steps:
   transferring the residual material flow from the axial separator to the downstream work member, wherein the downstream work member is constructed as a chopping member, wherein the residual material flow is distributed over a width of the chopping member by the vane element; and
   chopping the residual material flow by means of the chopping member and then transferring the chopped residual material flow to the ejection devices.

4. The method according to claim 1, further comprising the following method steps:
   acquiring data pertaining to the actual distribution of the residual material flow on the ejection devices by at least one sensor device in at least one measuring location;
   routing the acquired data to a control unit, and
   determining the deviation of the actual distribution from the reference distribution by the control unit.

5. The method according to claim 4, further comprising the step of generating control commands by means of the control unit depending on the deviation and conveying the control commands indirectly or directly to the vane element.

6. The method according to claim 1, wherein data pertaining to the actual distribution of the residual material flow are acquired by a plurality of sensor devices arranged at different measuring locations.

7. The method according to claim 5, wherein control of the vane element is carried out automatically depending on a control algorithm.

8. The method according to claim 1, wherein the movement speed of the vane element is changed constantly.

9. The method according to claim 6, wherein in addition to the data pertaining to the actual distribution of the residual material flow, data pertaining to
- a type of a respective harvested material,
- harvesting conditions,
- machine data of the combine harvester, or
- a reference swath width of the ejected residual material flow are further acquired, and the vane element is readjusted depending on at least a portion of the acquired data.

10. The method according to claim 1, wherein the combine harvester comprises a distributing device which is arranged downstream of the ejection devices, wherein the distributing device has a plurality of distributing plates by which the residual material flow ejected from the ejection devices is fanned out, wherein at least one of the distributing plates is adjustably constructed, wherein at least one sensor device is arranged in at least one measuring location in the distributing device by which data pertaining to an actual distribution of the residual material flow in the distributing device can be acquired, and wherein the distributing plate is readjusted so that the actual distribution of the residual material flow in the distributing device at least approximates the reference distribution.

* * * * *